US008341601B2

(12) United States Patent
Chan et al.

(10) Patent No.: US 8,341,601 B2
(45) Date of Patent: Dec. 25, 2012

(54) FLEXIBLE SLA MODELLING AND VALIDATION

(75) Inventors: Allen Vi Cuong Chan, Markham (CA); Tak Seng Chau, Markham (CA); Phil Coulthard, Aurora (CA); Hans-Arno Jacobsen, Toronto (CA); Helena Litani, Vaughan (CA); Vinod Muthusamy, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 12/419,988

(22) Filed: Apr. 7, 2009

(65) Prior Publication Data

US 2010/0257007 A1  Oct. 7, 2010

(51) Int. Cl.
*G06F 9/44* (2006.01)
(52) U.S. Cl. ............... 717/126; 717/127; 705/7.11
(58) Field of Classification Search ................. 717/126, 717/127; 705/7.11
See application file for complete search history.

(56) References Cited

U.S. PATENT DOCUMENTS

| | | | |
|---|---|---|---|
| 6,701,342 B1* | 3/2004 | Bartz et al. ............. | 709/200 |
| 7,058,704 B1 | 6/2006 | Mangipudi et al. | |
| 7,412,403 B2 | 8/2008 | Subbloie et al. | |
| 2005/0071182 A1* | 3/2005 | Aikens et al. ............. | 705/1 |
| 2008/0097807 A1 | 4/2008 | Chang et al. | |
| 2010/0146486 A1* | 6/2010 | Mehta et al. ............. | 717/126 |

OTHER PUBLICATIONS

Xiao at al "A Frame work for Verifying SLA Complicance in Composed Services", 2008 IEEE International Conference on Web Services, pp. 457-464.*

Tie Luo; Luoming Meng, "SLA foundation template library: reusable-component repository for SLA", Communication Technology Proceedings, 2003. ICCT 2003. International Conference on, vol. 2, Apr. 2003, p. 1739-1743.

Akhil Sahal, Anna Durante, Vijay Machiraju, Towards Automated SLA Management for Web Services, HP Laboratories, Palo Alto, California, HPL-2001-310R1, Jul. 2002.

* cited by examiner

*Primary Examiner* — Janice A. Mooneyham
*Assistant Examiner* — Kira Nguyen
(74) *Attorney, Agent, or Firm* — Thomas E. Lees, LLC

(57) ABSTRACT

A method for modeling, validating, and monitoring a service level agreement (SLA) associated with a business process is disclosed herein. Such a method may include providing a library of reusable SLA component types. Functionality may be provided to enable a user to create SLA components from the reusable SLA component types. Functionality may also be provided to enable the user to assemble the SLA components into an SLA model having a hierarchy. In the SLA model, events may be passed between the SLA components to trigger behavior by the SLA components. SLA components at the lowest levels of the hierarchy may be configured to receive events from the business process. The method may further validate the SLA model against the business process to ensure the business process can generate the events required by the SLA components. A corresponding apparatus and computer program product are also disclosed herein.

22 Claims, 9 Drawing Sheets

General Information
Name: ExecutionTimeSLA
Description:

Scope
Process: CreditCheckProcess

Entire Process {ReceiveApplication, ReplyApplicant}

[Add] [Delete] [Edit]

Metric

ExecutionTimeMetric{type: com.ibm.cas.sla.handlers.AvgProcessTimeMetricHandler}

[Add] [Delete] [Edit]

SLOs
Name: ExecutionTimeSLO
Description:
Boolean Expression: ExecutionTimeMetric < 10s

Actions
Name: ChargeProvider
Description:
Handler:

Service Level Agreements

ExecutionTimeSLA {ExecutionTimeSLO, ChargeProvider}

[Add] [Delete] [Edit]

```
onViolation (Event e) {
    if (e.violatedSLA ==
                TotalTimeByAllPersonSLO) {
        sendTo ("Joe Doe", e);
    } else {
        sendTo ("Mary White", e);
    }
}
```

Fig. 10

FLEXIBLE SLA MODELLING AND VALIDATION

BACKGROUND

1. Field of the Invention

This invention relates to service level agreements, and more particularly to apparatus and methods for modeling, validating, and monitoring service level agreements.

2. Background of the Invention

The ubiquity of the Internet has significantly transformed how modern-day businesses operate. For example, many companies now automate their business processes and make them accessible through the Internet as Web services. Entities can subscribe to these Web services and integrate them into their own business processes by invoking these services on demand. For example, many banks do not allocate resources to record and maintain the credit histories of their customers or potential customers. In order for the bank to determine a customer's credit rating, it may subscribe to a credit-check service from a third party and integrate this service into its own business process, such as a loan approval process.

As entities exchange services such as Web services, mechanisms are needed to ensure that the services are provided with the qualities of service agreed upon or expected by the entities. These qualities of service are often expressed in service level agreements (SLAs). An SLA may be viewed as a contract between a service provider and a service consumer. It may define the quality of service that the provider and consumer agree to deliver and consume, respectively. In certain cases, the SLA may also specify appropriate actions to be taken if the terms of the agreement are violated. For example, a service provider may incur a penalty (e.g., a fee) if a service is not provided in the agreed upon manner.

To ensure that the parties comply with an SLA, one or both parties may monitor a business process to detect violations. However, as more services have become automated and accessible online, monitoring has become more complicated and manual monitoring has become less feasible. In addition, implementing an automated monitoring process requires significant expertise and manpower because a customized solution is often needed. As a result, developers typically have to use various technologies to deliver a suitable monitoring solution, a process that often requires significant effort and expertise. Furthermore, the resulting solution is typically nonstandard, ad hoc, error-prone, and not optimized for performance.

In view of the foregoing, what is needed is an apparatus and method to simplify the modeling, validating, and monitoring of SLAs. Ideally, such an apparatus and method would provide loose coupling between business process artifacts and SLA artifacts, allowing the two to be developed independently and without the need to regularly synchronize the two. Such an apparatus and method would also ideally provide high modularity and extensibility. Yet further needed is a runtime architecture to effectively enforce an SLA. Ideally, the runtime architecture will include a validation framework that ensures that an SLA is applicable to a business process.

SUMMARY

The invention has been developed in response to the present state of the art and, in particular, in response to the problems and needs in the art that have not yet been fully solved by currently available apparatus and methods. Accordingly, the invention has been developed to provide improved apparatus and methods for modeling, validating, and monitoring service level agreements. The features and advantages of the invention will become more fully apparent from the following description and appended claims, or may be learned by practice of the invention as set forth hereinafter.

Consistent with the foregoing, a method for modeling, validating, and monitoring a service level agreement (SLA) associated with a business process is disclosed herein. Such a method may include providing a library of reusable SLA component types. Functionality may be provided to enable a user to create SLA components from the reusable SLA component types. Functionality may also be provided to enable the user to assemble the SLA components into an SLA model having a hierarchy. In the SLA model, events may be passed between the SLA components to trigger behavior by the SLA components. SLA components at the lowest levels of the hierarchy may be configured to receive events from the business process. The method may further include validating the SLA model against the business process to ensure that the business process is configured to generate the events required by the SLA components at the lowest levels of the hierarchy.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6 shows one embodiment of an editor to allow a user to model an SLA for a business process;

FIG. 10 shows one example of an action handler written in pseudo code.

DETAILED DESCRIPTION

Figure 1:
FIG. 1 shows one example of a loan approval process described in a business process modeling language.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer program product embodied in any tangible medium of expression having computer-usable program code stored in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a business process can be automated in a number of different ways. Several open standards are available for modeling the logic of business processes, one example of which is the Business Process Execution Language (BPEL). The BPEL language may be used to describe the business logic of a process, and may define the actual behavior of a participant in a business interaction without specifying the actual implementation. Other business process modeling languages are also known, such as the Business Process Modeling Notation (BPMN) and Web Services Flow Language (WSFL), which both serve a similar purpose to BPEL.

In general, every business process modeling language may define a set of basic constructs to describe a business process. The BPEL modeling language, for example, defines constructs such as the <receive>, <invoke> and <reply> activities to describe a business process. For example, FIG. 1 shows a loan approval process 100 described using various BPEL constructs. As shown, the process 100 is represented as a series of activities. The process 100 begins with a <receive> activity that represents the arrival of a loan application. The process 100 continues by retrieving the credit history of the applicant, which is accomplished by the first <invoke> activity in the process. If the applicant has a good credit rating, the request is approved. Otherwise, it is rejected. The <switch> decision activity performs this evaluation. The process 100 then sends a reply to the applicant.

Once a business process is modeled, the owner of the process is free to choose how to implement the services used in the process. For example, the process 100 may use a credit check service, which may be implemented as an internal procedural call or provided by a third party such as a credit rating agency. By combining different services together, a business process 100 can be formed to handle complex business logic.

If the process 100 uses a third party service to check credit, the parties providing and consuming the service may agree on a satisfactory level of service that the provider must fulfill. A service level agreement (SLA) may be introduced to address this requirement. The SLA may define the quality of service that must be delivered by the service provider. The service consumer, in turn, relies on this level of service, as the service consumer might itself offer service guarantees to its customers. The SLA may also specify appropriate actions to be taken if the terms and conditions are violated, such as imposing a penalty on the service provider.

Figure 2:
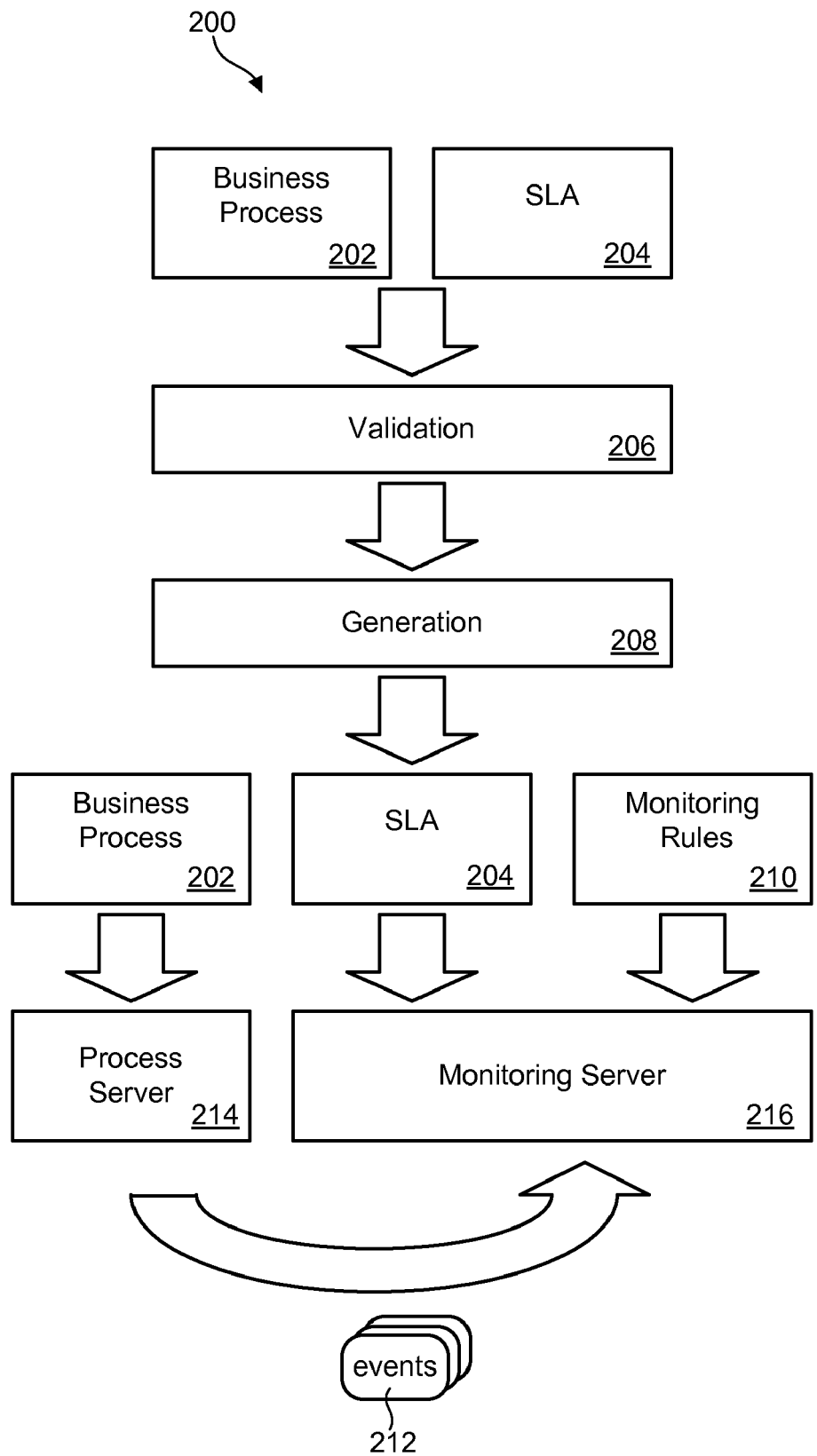
FIG. 2 is a flow chart showing a high-level view of one embodiment of a methodology for modeling, validating, and monitoring an SLA.

Referring to FIG. 2, modeling, validating, and monitoring an SLA may be challenging due to a lack of available tools for performing such for a given business process. For example, a developer may have to use various technologies and use them in various non-standard ways to produce a suitable solution. Creating a solution in this manner is often time-consuming and error-prone. In addition, the solution may not be optimized for performance, memory use, or the like.

In order to model, validate, and monitor an SLA, a developer may initially analyze SLA documentation in order to understand its requirements. For example, the developer may need to extract key performance indicators from the document that governs the SLA. Once these indicators are identified, the developer may then need to instrument the business process in a way that the indicators can be measured. This may be difficult if the business process requires modifications to enable instrumentation. In some cases, additional programming logic may be required to measure performance of the business process. Consequently, the developer may need to modify the business process in a significant way in order to monitor the SLA. This is usually undesirable as it discourages reuse of the SLA and makes it difficult to extend and maintain both the SLA and the business process.

If a business process is capable of emitting events, an SLA developer may potentially separate the SLA logic from the business process logic. The SLA logic may be invoked when relevant events are emitted by the business process so that the SLA logic can evaluate compliance with the SLA. However, determining which set of events is critical to evaluating an SLA may itself be a time-consuming process. As a result, an SLA developer may configure the business process to emit all possible events in an effort to simplify the development process. Unfortunately, this may increase performance overhead as unnecessary events are emitted and processed.

To address these problems, an improved methodology 200 for modeling, validating, and monitoring a service level agreement (SLA) is disclosed herein. This methodology 200 provides an automated approach for determining which events are required to evaluate an existing SLA and which monitoring rules are needed to dynamically track service level objectives (SLOs) associated with the SLA. An overview of the methodology 200 is illustrated in FIG. 2. In the methodology 200, it is assumed that a business process 202 may be represented as a directed graph with nodes representing tasks or activities in the business process 202 and directed edges describing the control flow of the business process 202. It is also assumed that each activity in the business process 202 is assigned a unique identifier.

Figure 3A:
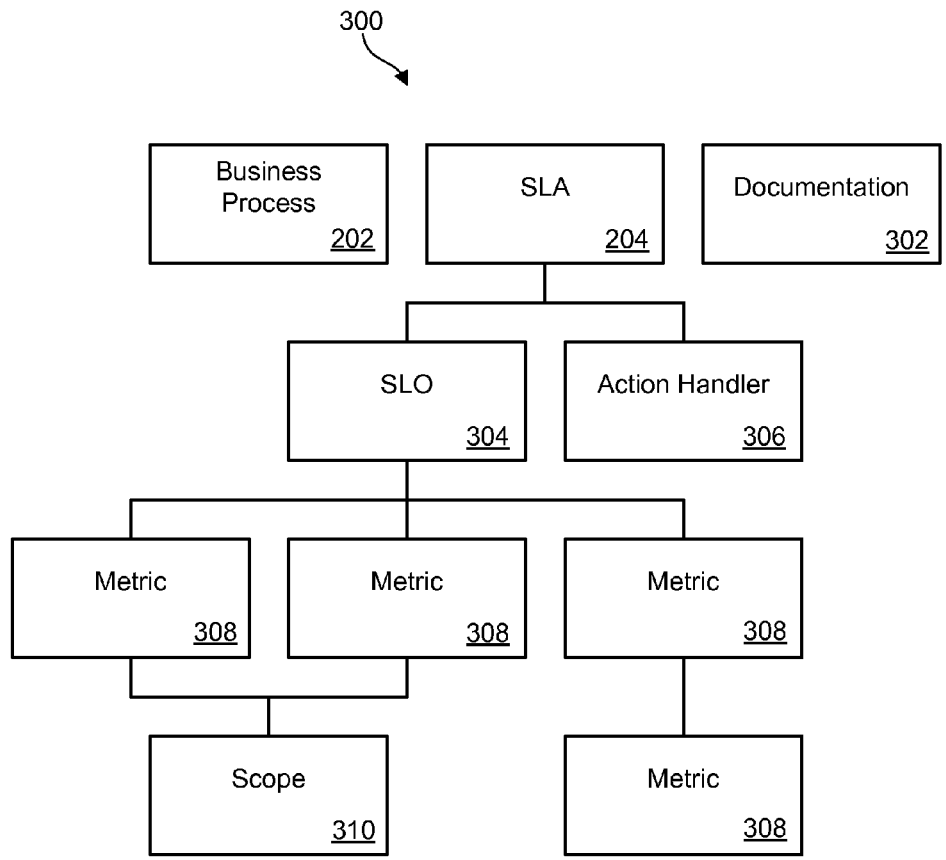
FIG. 3A is a high-level block diagram providing a general overview of an SLA model and its hierarchy.

As shown in FIG. 2, the methodology 200 may begin with an SLA 204 that is programmatically captured in a formal SLA model (as will be shown in FIG. 3A). This SLA model may be loosely coupled with a business process 202 so that developers can evolve both artifacts 202, 204 concurrently. When both the business process 202 and the SLA 204 are complete, they are validated 206 to ensure that the SLA 204 is applicable to the business process. This validation step 206 is performed because the established relationship between the business process 202 and the SLA 204 may be broken during parallel development of the two artifacts 202, 204. After validation 206, the two artifacts 202, 204 are provided as inputs to a generation step 208.

The generation step 208 may identify a set of events 212 in the business process 202 that are necessary to monitor the SLA 204. The occurrence of these events 212 potentially signals violation of the SLA 204. It is assumed that the business process 202 is capable of emitting events 212 when it begins or ends an activity, or when it throws an exception. An event 212 may contain a snapshot of the current state of the business process 202, and important data may be retrieved from the event 212 in order to determine compliance with the SLA 204. This important data may include, for example, a unique identifier associated with a particular activity, input parameters, output parameters, and/or global parameters of the business process 202. The generation step 208 may ensure that the business process 202 is configured to emit the minimal set of events 212 required to monitor compliance with the SLA 204.

In addition to ensuring that correct events 212 are emitted by the business process 202, the generation step 208 may also create a set of monitoring rules 210 from the SLA 204. These monitoring rules 210 may be evaluated when an event 212 of interest is emitted from the business process 202. If any monitoring rule 210 is violated, an appropriate action may be triggered. For example, once the business process 202 and SLA 204 are deployed in a process server 214 and monitoring server 216, respectively, the monitoring rules 210 corresponding to the SLA 204 may be deployed. These rules 210 may continuously monitor the business process 202 to monitor compliance with the SLA 204.

Referring to FIG. 3A, a high-level block diagram providing a general overview of an SLA model 300 in accordance with the invention is illustrated. As discussed previously, it is assumed that, during execution, a business process 202 is capable of emitting events 212 that contain a snapshot of the current state of the business process 202. It is also assumed that the business process 202 can be modeled as a directed graph with control flows that describe the business logic. The SLA model 300 works with these assumptions in extending the concepts of WSLA with various refinements. These refinements simplify the existing model without losing any critical information when defining an SLA 204. The SLA model 300 is extensible and inheritable to allow maximum reuse. As a result, complex SLAs 204 may be composed by combining simpler SLAs and their components. FIG. 3A provides an example of the overall structure of the SLA model 300.

As shown in FIG. 3A, each SLA model 300 may include a reference to a business process 202 being monitored. In certain embodiments, the reference is simply a file location of a business process definition, which may be expressed in any supported process modeling language. The SLA model 300 may also include a reference to documentation 302 detailing the contract associated with the level of service agreed to by both parties. SLA developers may refer to this documentation 302 when modeling an SLA 204.

An SLA 204 provides the topmost element of the model 300. As shown in FIG. 3A, hierarchical relationships may be established between an SLA 204 and other components 304, 306, 308 in the model 300. For example, service level objective (SLO) components 304, action handler components 306, and metric components 308 may be assembled in a hierarchical relationship below the SLA component 204. In general, higher level components have dependency relationships with lower level components. Components 304, 306, 308 may be reusable so that multiple components can establish a dependency with the same component. Each of the components 304, 306, 308 will be described in more detail hereafter.

Figure 4:
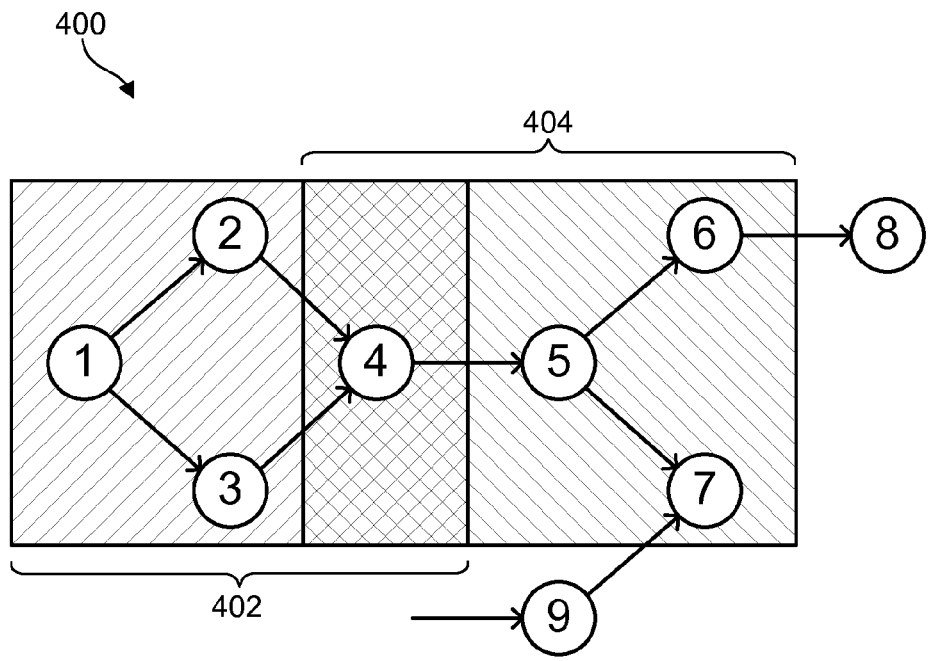
FIG. 4 is a directed graph representing a business process, and further showing how a "scope" defines a region or subsection of the business process.

A "scope" 310 may be used to define a region or subsection of a business process 202 being monitored. The SLA model 300 may allow multiple scopes 310 to be defined. A scope 310 may be expressed as a series of start and end node pairs in a process diagram of a business process 202. For example, FIG. 4 shows a process diagram 400 in which each activity is identified by a unique ID. In this example, the process diagram 400 includes two sections 402, 404 that overlap with one another. The left region 402 may be expressed as {1, 4} because it begins at node 1 and ends at node 4. This notation may be used to describe all path entries that begin with node 1 and end with node 4. Thus, paths 1-2-4 and 1-3-4 are considered to be in this region 402.

The proposed scope definition is flexible enough to express a wide variety of regions. For example, to express the scope for the region 404 on the right, a series of start and end node pairs, such as {{4, 6}, {4, 7}}, may be defined. This definition may capture all paths within the region 404. More complex regions may also be expressed in a similar manner.

Returning again to FIG. 3A, metrics 308 may also play an important role in the SLA model 300. Metrics 308 may be used to measure different aspects of a business process 202. For example, a metric 308 may be used to measure the performance of a business process 202 and/or capture information that is helpful to evaluate compliance with an SLA 204. As an example, metrics 308 may be used to measure customer usage of a subscribed service to evaluate whether the subscribed service is underused. Once one or more metric components 308 are established, an SLO component 304 may be created that evaluates the data provided by the metrics 308.

Figure 3B:
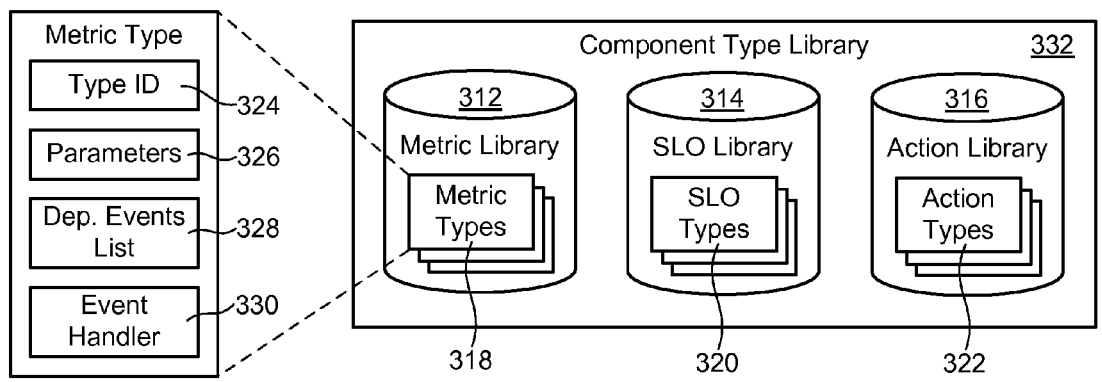
FIG. 3B is a high-level block diagram showing one embodiment of an SLA component type library.

Referring to FIG. 3B, in certain embodiments, a metric 308 is expressed as an instance of a metric type 318 in a metric type library 312. This metric type library 312 may be part of a larger component type library 332. In certain embodiments, the metric type library 312 may contain a collection of reusable metric types 318 which a user can augment with their own metric types 318. A metric type 318 may define specific data and format to be captured as well as the methodology and business logic needed to gather the data. In addition, the metric type 318 may specify one or more events 212 that will trigger taking of a measurement.

In certain embodiments, a metric type 318 includes or defines one or more of the following components: a type identifier 324, parameters 326, a dependent events list 328, and an event handler 330. A type identifier 324 may be a unique identifier that is assigned to every metric type 318 in the metric library 312. In certain embodiments, a new metric may be extended from a metric type 318 by referencing the type's identifier 324.

A list of required parameters 326 may also be defined for each metric type 318. Metric types 318 may use these parameters 326 for their operation. The actual values of the parameters 326 may be provided at a later time when a metric instance 308 is defined. Detaching parameter values from the schema gives users more flexibility to customize the metrics 308. For example, a user may create multiple metrics 308 instances from the same metric type 318. By assigning different parameter values to each metric 308, a user may customize the metrics 308 to measure different aspects of a business process 202.

Each parameter 326 in a metric type 318 may specify its data type and optionally its range. Parameter values 326 may include, for example, scalars, scopes, individual activities, and other metrics. The scope parameter 326 may define a region in a business process 202 where the metric 308 applies. Some metric types 318 may not specify a scope as a parameter 326, as the target region may be implicitly defined. For example, a metric type 318 for measuring the transaction time of a business process 202 may not require a scope since the scope may be implicitly defined to be the entire process 202.

Metrics 308 may also be included as parameters of other metric types 318. These metric types 318 may require other metrics 308 to assist in taking measurements. For example, to measure the percentage of successful executions of a business process 202, a metric 308 may require other metrics 308 that measure the total number of executions and the total number of successful executions. As a result, a metric type 318 may require these two metrics 308 as parameters.

In certain embodiments, a dependent events list 328 defines events 212 that should be emitted by a business process 202. These events 212 may trigger the dependent metrics 308 to take measurements. For example, to measure the execution time of a business process 202, the corresponding metric type 318 may need to be notified of the entry and exit events of the process 202. Thus, the dependent events list 328 for this metric type 318 may be defined as {$Process_{entry}$, $Process_{exit}$}, where $Process_{entry}$ is the start activity and $Process_{exit}$ is the end activity of the business process 202.

The dependent events list 328 may be read at various places in the methodology 200. For example, it may be read during validation 206 to collect the set of events 212 that need to be emitted by the referencing business process 202. The validation step 206 may verify that the process 202 is capable of emitting the events 212 required by the SLA 204. It may also be invoked to retrieve a list of events 212 and enable the events 212 in the referencing business process 202, as occurs in the generation step 208.

The event handler 330 for a metric type 318 may contain logic defining how a measurement should be taken. The event handler 330 may be executed when a relevant event 212, specified in the dependent events list 328, is emitted. The triggering event 212 may be passed as input to the event handler 330. In certain embodiments, the event handler 330 may retrieve data from the event 212 so the event 212 can be processed correctly.

Figure 5:
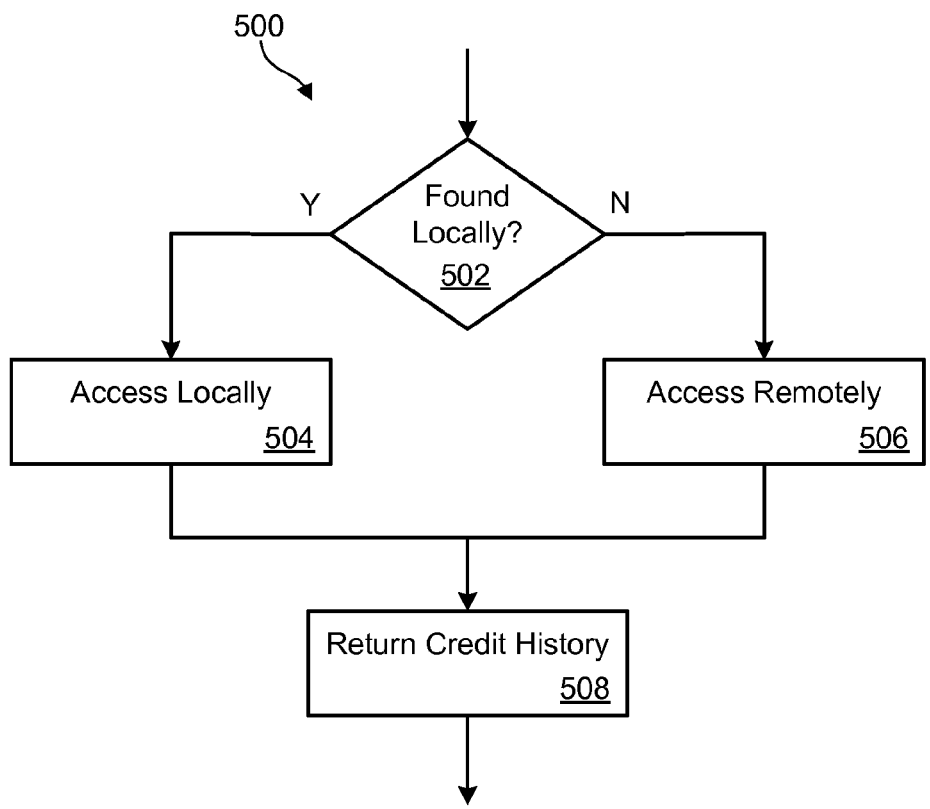
FIG. 5 is a flow chart showing one example of a credit check process.

Referring to FIG. 5, a business process 500 showing the concepts of metric types 318 and metrics 308 is illustrated. Assume that the credit check service in the loan approval process 100 of FIG. 1 is provided by a third party. FIG. 5 shows the details of this process 500. In this example, the process 500 checks 502 whether an applicant's credit history is located in a local database. If so, the process 500 accesses 504 the credit history locally. Otherwise, the process 500 accesses 506 the credit history from a remote database, which is a more expensive operation. Assume that an SLA 204 specifies that the percentage of remote database accesses is under a certain threshold. To calculate this percentage, two metrics 308 may be created. These metrics 308 may be extended from the same metric type 318, which is shown in Table 1 below:

TABLE 1

Metric Type for Measuring Number of Invocations

| Type Identifier | InvocationCountType |
|---|---|
| Parameters | Scope (type: scope) |
| Dependent Events List | {$Scope_{entry}$} |
| Event Handler | OnEvent(Event e) { <br>   static total; <br>   total = total+1; <br>   publish(total, e.instanceid); <br> } |

The metric type 318 shown in Table 1 includes a "scope" as a parameter. The scope identifies the region of interest in the business process 202. In the illustrated process 500, both the local and remote access steps 504, 506 access data from a database. To measure the number of invocations, a metric 308 should be notified when an entry event of the scope occurs. When this occurs, the event handler 330 specified in Table 1 is invoked. The event handler 330 updates the number of invocations and publishes an update event 212 to notify other components of the change.

Using the metric type 318 of Table 1, two metric instances 308 may be created to measure the number of invocations for both the local and remote access steps 504, 506. These metrics 308 are summarized in Tables 2 and 3 below:

TABLE 2

Metric for Measuring Number of Local Accesses

| Name | LocalAccessCount |
|---|---|
| Metric Type | InvocationCountType |
| Parameters | Scope = {LocalAccess} |

TABLE 3

Metric for Measuring Number of Remote Accesses

| Name | RemoteAccessCount |
|---|---|
| Metric Type | InvocationCountType |
| Parameters | Scope = {RemoteAccess} |

Once the metrics 308 described in Tables 2 and 3 are created, a new metric may be created to measure the percentage of remote accesses compared to local accesses. Table 4 shows a metric type 318 that may be used to calculate this percentage. This percentage metric type 318 accepts the above two metrics 308 as input parameters and is notified whenever the metrics 308 emit an update event 212 to indicate a value change. When the percentage metric 308 is notified, the event handler 330 associated with the percentage metric 308 is invoked to compute the new percentage. The percentage metric 308 may then generate an update event 212 to notify others who may be interested in the state change.

TABLE 4

Metric Type for Computing Percentage

| Type Identifier | CalcPercentageType |
|---|---|
| Parameters | Metric 1 {type: InvocationCount-Type} |
| | Metric 2 {type: InvocationCount-Type} |
| Dependent Events List | {Metric1$_{update}$, Metric2$_{update}$} |
| Event Handler | OnEvent(Event e) { |
| |   static m1, m2 |
| |   if (e.source = Metric1) |
| |     m1 = e.total |
| |   else |
| |     m2 = e.total |
| |   publish( m1/(m1+m2) * 100%, e.instanceid) |
| | } |

Given the above metric type 318, a new metric 308 may be created, as shown in Table 5. The metrics from Tables 2 and 3 are assigned to the new metric 308 to measure the percentage of remote accesses.

TABLE 5

Metric for Computing Percentage of Remote Accesses

| Name | RemoteAccessPercentage |
|---|---|
| Metric Type | CalcPercentageType |
| Parameters | Metric 1 = RemoteAccessCount |
| | Metric 2 = LocalAccessCount |

A service level objective (SLO) 304 defines a goal of the SLA 204. It may be expressed as a Boolean expression in terms of metrics 308. In certain cases, multiple SLOs 304 may be defined in a single SLA model 300. Similar to metrics 308, SLOs 304 may be defined by extending an SLO type 320 in an SLO type library 314. For example, the SLO type 320 illustrated in Table 6 may be used to ensure that the percentage of remote database accesses is below some specified threshold.

TABLE 6

Example of an SLO Type

| Type Identifier | LessThanSLOType |
|---|---|
| Parameters | Metric (type: CalcPercentageType) |
| | Threshold (type: int) |
| Dependent Events List | {Metric$_{update}$} |
| Boolean Expression | OnEvent(Event e) { |
| |   if(!(metric < threshold)) |
| |     publish(violate, e.instanceid); |
| | } |

The SLO type 320 above requires two parameters for evaluation: the metric 308 that computes the percentage of remote accesses, and a scalar value that represents the desired threshold. If an SLO 304 extends from the above SLO type 320, its event handler 330 will be invoked to evaluate the condition when an update event 212 is emitted from the dependent metric 308. As shown in Table 6, a violation event 212 is emitted when the condition is violated, thereby notifying interested parties. An SLO component 304 created from the SLO type 320 of Table 6 is shown in Table 7:

TABLE 7

Example of an SLO

| Name | CreditCheckSLO |
|---|---|
| SLO Type | LessThanSLOType |
| Parameters | Metric = RemoteAccessPercentage |
| | Threshold = 10% |

As mentioned earlier, when an SLO is violated, certain actions may be taken. For example, an email may be sent to a manager or a service provider may be charged a penalty. The SLA model 300 may take these actions using action handlers 306. Like the metric and SLO types 318, 320 previously discussed, action handlers 306 may be created from action handler types 322 stored in an action handler library 316. These action handler types 322 may include logic to be executed when an SLO 304 is violated. An action handler 306 may include a function, written in any given programming language, which is invoked when an SLO 304 is violated. To achieve a high degree of flexibility, in certain embodiments, multiple action handlers 306 may be defined within a single SLA model 300.

In the SLA model 300, an SLA 204 may be expressed as one or more pairs of SLOs 304 and action handlers 306. The SLO 304 may specify the goal of the SLA 204, whereas the action handler 306 may define the action to be taken if the SLO 304 is violated. For example, continuing with the loan approval example, an SLA 204 that monitors whether a percentage of remote database accesses is below a predefined threshold may be expressed as:

SLA={PercentageSLO, chargeProvider}

In certain cases, the SLA model 300 may be configured such that several action handlers 306 execute upon violation of a single SLO 304. In other cases, violations of multiple SLOs 304 may cause the same action handler 306 to execute. As a result, in certain embodiments, the definition of an SLA 204 may be further generalized to encourage maximum reuse of SLOs 304 and action handlers 306 as follows:

$$SLA = \{\{SLO_1 \ldots, SLO_n\}, \{Action_1 \ldots, Action_n\}\}$$

The disclosed SLA model 300 provides a number of advantages in modeling SLAs 204 for a given business process 202. First, the model 300 may be used to define metrics 308 by extending metric types 318. By implementing metrics 308 from metric types 318, the model 300 encourages reuse of metrics 308. As different metrics 308 are commonly used by different business processes 202, this architecture is highly useful for SLA developers.

Secondly, metric types 318 may utilize scopes 310 and parameters 326 to allow users to customize metrics 308 to fit their needs. For example, by defining a metric type 318 that measures the time taken for a scope 310, users are able to reuse the metric type 318 to measure different regions within a business process 202. Furthermore, multiple metric instances 308 may be created that extend the same metric type 318, with each being assigned to different scopes 310 of interest. For example, as was discussed in association with FIG. 5, two metrics 308 may be created from the same metric type 318 to measure the number of invocations for different scopes. In addition, the disclosed model 300 allows users to customize metrics 308 by overwriting the default implementations of event handlers 330. This allows users to fine tune metrics 308 in the model 300.

Furthermore, the model 300 allows complex metrics 308 to be constructed by assembling other metrics 308. The metric type 318 illustrated in Table 4 shows how a metric type 318 may be configured to consume data generated by other metrics 308 to compute a percentage. Similarly, the model architecture 300 also encourages reuse of SLOs 304 and action handlers 306. Because SLOs 304 extend SLO types 320, SLA developers can reuse the same type 320 to create multiple SLOs 304. In addition, an SLO 304 can provide a goal for multiple SLAs 204. Action handlers 306 can also be used by multiple SLAs 204 in a similar fashion.

The reusability of components 318, 320, 322 within the model 300 makes it easier to apply an SLA model 300 from one business process 202 to another. For example, in certain situations, applying an SLA 204 to another business process 202 may be as simple as updating the business process definition to refer to the new business process 202. As discussed in more detail hereafter, a validation step 206 will ensure that the SLA 204 is applicable to the new process 202. In certain cases, parameters such as scope definitions 310 may no longer be valid, or the business process 202 may be unable to emit events 212 that are needed to execute the SLA 204. These incompatibilities may be identified in the validation step 206 to allow correction by a user.

Referring to FIG. 6, in selected embodiments, an editor 600 may be provided to enable users to create and modify an SLA model 300. As shown in the illustrated editor 600, the editor 600 may allow a user to develop an SLA model 300 by creating metrics 308 and SLOs 304 from types 318, 320 in corresponding libraries 312, 314. The editor 600 may also allow a user to define scopes 310 and designate actions 306 to take when an SLO 304 is violated. In certain embodiments, the editor 600 may allow users to create new metric and SLO types 318, 320 in the libraries 312, 314 through an extension framework. This provides extensibility and flexibility to the model 300. In certain embodiments, a wizard may be provided to generate monitoring artifacts from a completed SLA model 300 and its referencing business process 202.

Referring again to FIGS. 2 and 3A, as previously discussed, the SLA 204 and its referencing business process 202 may be validated 206 to ensure that the business process 202 satisfies all the requirements of the SLA 204. For example, SLA scopes 310 may be resolved during the validation process 206. After validation 206, the SLA 204 and its referencing business process 202 may be passed to the generation step 208 which generates monitoring artifacts. In doing this, the generation step 208 may determine which events 212 are needed by the SLA 204 and enable these events 212 in the business process 202. The generation step 208 may then generate a set of monitoring artifacts to execute the SLA 204. These monitoring artifacts respond to events 212 emitted by the business process 202 in order to evaluate the SLA 204.

As shown in FIG. 2, the generated monitoring artifacts may be deployed on a monitoring server 216 where they may be executed. Similarly, the referencing business process 202 may be deployed on a process server 214. While the business process 202 is executed, the monitoring artifacts monitor the process 202 to detect whether the SLA 204 is violated. These steps will be described in more detail hereafter.

The validation process 206 shown in FIG. 2 may involve multiple steps. First, all scopes 310 may be validated to ensure they can be resolved in the business process 202. This may include verifying that the start and end activity of any scope 310 exist in the referencing business process 202. Secondly, the validation process 206 may ensure that metrics 308 are assigned the correct set of parameters, as defined by their metric type 318.

The validation process 206 may also analyze the SLA 204 and the business process 202 to ensure that the business process 202 is able to emit the set of events 212 that are needed to execute the SLA 204. This may be accomplished by initially discovering all SLOs 304 that are defined in the SLA model 300. Starting with these SLOs 304, the validation process 206 may retrieve the metrics 308 that the SLOs 304 depend on from the hierarchy 300. This process may continue recursively until all nested metrics 308 are obtained. For each metric 308, the validation process 206 may read its dependent events list 328 to discover the set of events 212 required by the metric 308. The union of all resulting event sets provides the set of events needed to execute the SLA 204. Given this event set, the validation process 206 ensures that each event 212 in the set can be emitted by the business process 202.

As discussed previously, the SLA model architecture 300 listens to events 212 emitted from the business process 202. These events 212 invoke event handlers 330 in the affected SLAs 204 to determine if the SLAs 204 have been violated. Typically, only a limited set of events 212 are needed for SLA monitoring. For example, an SLA 204 to ensure a process execution time is under a specified limit requires only two events 212 to be emitted—the entry and exit event of the referenced business process 202. Processing events may be very costly in that it consumes both computing and network resources. Thus, it is desirable to reduce performance overhead by only enabling the set of the events 212 that are needed for SLA evaluation.

As shown in FIG. 3A, the SLA model 300 is structured hierarchically. Top level components may depend on lower level components. If the state of any child component is changed, it has the potential to impact higher level components in the model 300. For example, referring to FIG. 7, in the credit check process previously described, when an entry event 312 of the local access activity is emitted, the corresponding metric 308 is notified to update the number of invocations. In response to this update, other metrics 308 that depend on this metric 308 are also updated. In this example, the metric 308 that computes the percentage is also updated. In this manner, a ripple effect occurs that causes reevaluation of the SLO 304. A pattern similar to the publish-subscribe model is followed.

Figure 7:
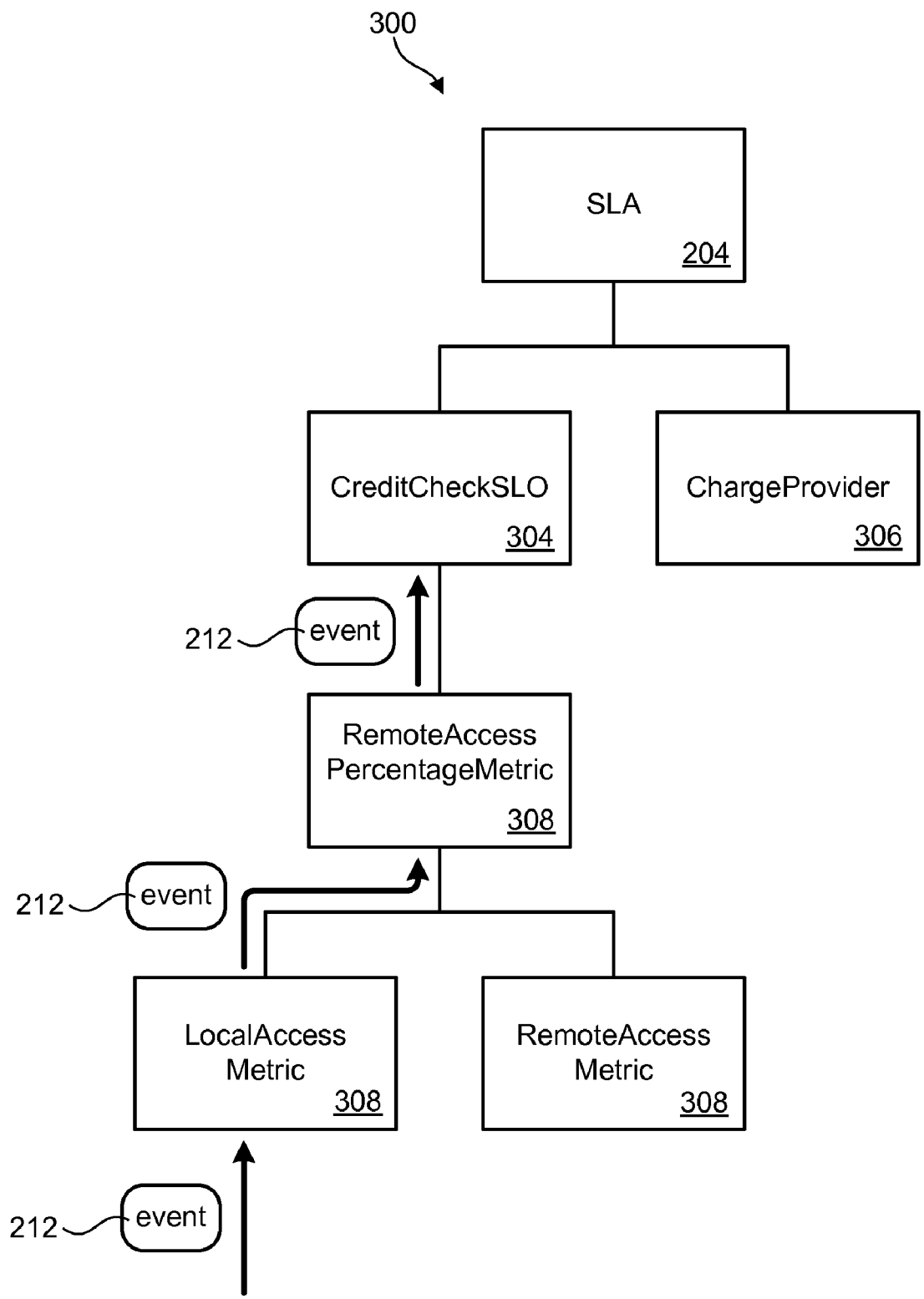
FIG. 7 is a high-level block diagram of an SLA model showing event propagation between SLA components.

FIG. 7 shows the runtime architecture that executes SLAs 204. In the runtime architecture, SLA components such as metrics 308, SLOs 304, and action handlers 306 become clients of the publish-subscribe system. That is, each component may both subscribe to and publish events 212. To determine the set of events 212 a client is interested in, its dependent events list 328 may be read. To execute the SLA 204, the target business process 202 may be registered as a publisher in the system. During execution, the business process 202 will emit events 212 previously enabled in the generation process 208.

Figure 8:
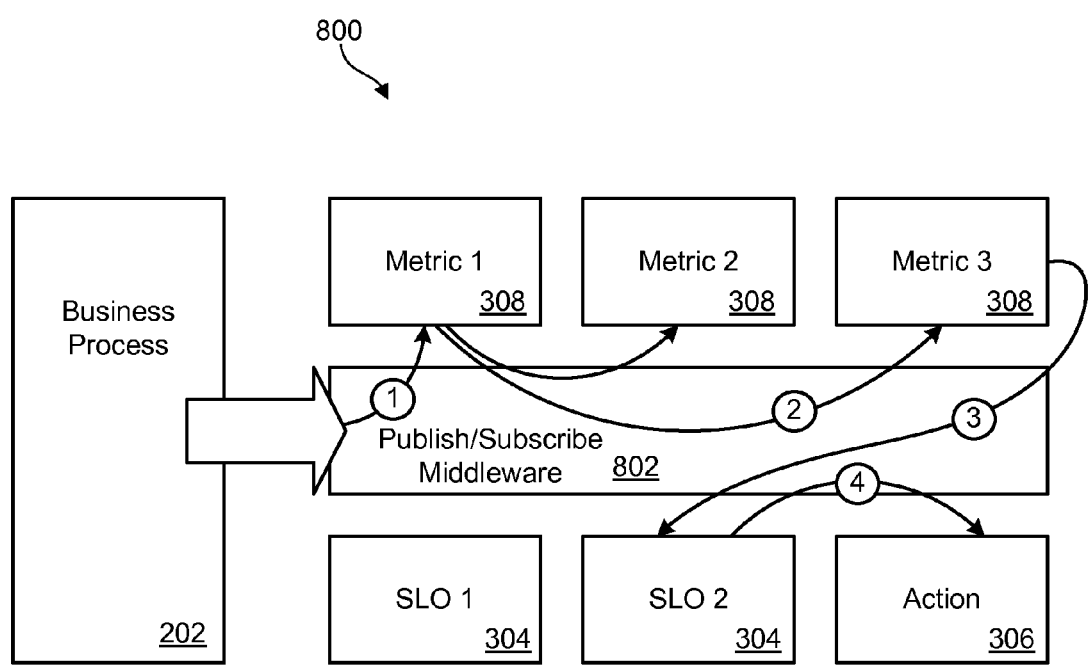
FIG. 8 is a high-level block diagram of a runtime architecture in accordance with the invention.

Referring to FIG. 8, when events 212 from a business process 202 enter the system 800, publish-subscribe middleware 802 forwards (1) the events 212 to interested clients. If the client is a metric 308, its event handler 330 is invoked to update its value. The handler 330 may also emit (2) new events 212 into the system 800 as a result of the update. These events 212 may, in turn, be forwarded (3) to other interested clients, causing the clients to reevaluate. This chain of action continues until it reaches (4) a top level client. In this example, an action handler 306 is executed in the event the SLO 304 is violated.

This architecture 800 provides a number of advantages. First, all clients in the publish-subscribe system may be loosely coupled, which encourages reuse of these clients during runtime execution. For example, if several SLAs 204 depend on the same set of metrics 308, a monitoring server 216 may reduce overhead by reusing the metric instances 308. This may be accomplished, for example, by switching program contexts when executing a metric 308. Loose coupling also allows an SLA 204 to be executed in a distributed environment. Since the architecture 800 is highly modular, distributed computing is readily achieved by distributing the clients throughout a server cluster.

Figure 9:
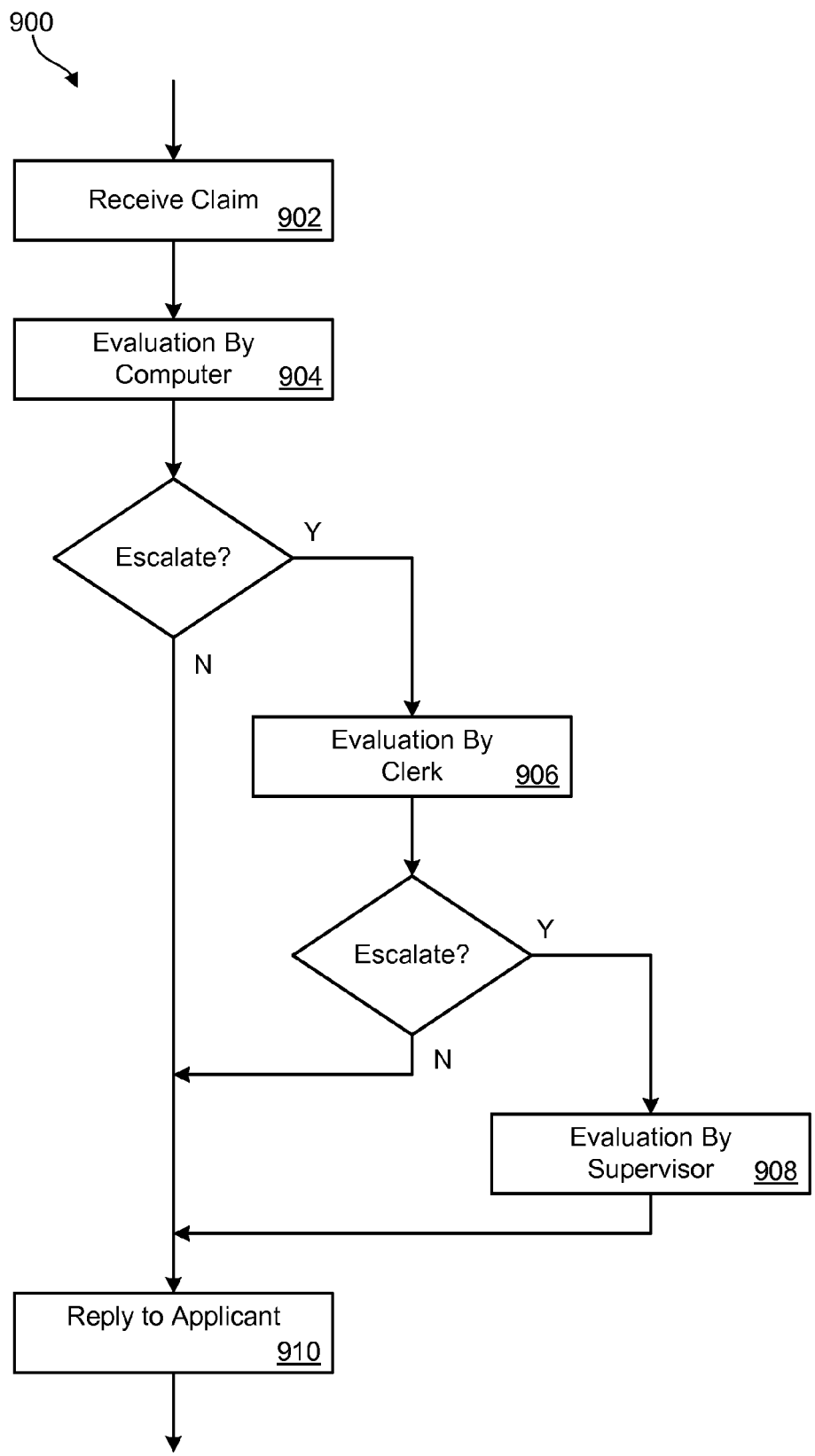
FIG. 9 is a flow chart showing one example of a claim approval process.

Referring to FIG. 9, in order to illustrate the methodology 200 for modeling, validating, and monitoring an SLA 204 for a business process 202, an end-to-end scenario is presented. In this example, an insurance company models its claim approval process 900. The claim approval process 900 is composed of a number of activities. The process 900 starts by receiving 902 an applicant claim form. An automated process initially evaluates 904 the application. The application is automatically processed if enough information is provided and the applicant has a good credit history. Otherwise, the application is passed to a junior clerk for evaluation 906. Depending on the complexity of the application, the clerk may escalate the request to a supervisor for evaluation 908. Regardless of who processes the application, an evaluation is performed and a reply is eventually provided 910 to the applicant.

Assume that by evaluating the SLA requirements, it is determined that three metrics 308 are needed. A first metric 308 is needed to measure the total execution time used by all individuals, a second metric 308 is needed to measure the total execution time used by supervisors only, and a third metric 308 is needed to calculate a percentage by composing the first two metrics 308. To create the first and second metrics 308, it should be noted that both metrics 308 are similar in nature because both measure the execution time of some portion of the business process 900. As a result, a metric type 318 may be defined to measure the total execution time as shown in Table 8. Such common metric types may already be available in a metric type library for immediate use.

TABLE 8

Metric Type for Measuring Execution Time

| | |
|---|---|
| Type Identifier | TotalExecTimeType |
| Parameters | Scope (type: scope) |
| Dependent Events List | {Scope$_{entry}$, Scope$_{exit}$} |
| Event Handler | OnEvent(Event e) { <br>   static total = {i$_1$, ..., i$_n$}; <br>   static entry = {i$_1$, ..., i$_n$}; <br>   if(e is entry_event){ <br>     entry[e.instanceid] = e.time <br>   }else{ <br>     diff = e.time − entry[e.instanceid]; <br>     total[e.date] = total[e.date] + diff; <br>     publish(total[e.date], <br>   e.instanceid); <br>   } <br> } |

This metric type 318 measures the total execution time required by a given scope 310. Specifically, the metric type 318 listens to the entry event of a first activity of the scope and the exit event of the last activity of the scope to record the total execution time of the region. When an entry event is received, the event handler 330 records the start time. Similarly, the event handler 330 records the finish time when an exit event is received. It is assumed that the event 212 captures a snapshot of the current state of the process 202 and that the start and finish times can be retrieved from the event 212. Once both times are recorded, the total execution time may be calculated and published to interested components. Given the above metric type 318, two metrics 308 may be defined as follows:

TABLE 9

Metric for Measuring Total Execution Time

| | |
|---|---|
| Name | TotalTimeByAllPersons |
| Metric Type | TotalExecTimeType |
| Parameters | Scope = {{EvaluationByClerk}, {EvaluationBySupervisor}} |

TABLE 10

Metric for Measuring Execution Time of Supervisors

| | |
|---|---|
| Name | TotalTimeByAllSupervisors |
| Metric Type | TotalExecTimeType |
| Parameters | Scope = {EvaluationBySupervisor} |

The metric 308 shown in Table 9 calculates the total execution time spent by all individuals. This metric 308 extends from the metric type 318 shown in FIG. 8. Two scopes 310 are assigned as input parameters when the metric 308 is declared, so as to achieve the objective of measuring the total execution time spent by all individuals (which includes junior clerks and supervisors). Similarly, the metric 308 shown in Table 10 extends the same metric type 318. This metric 308 is assigned a single scope 310 which enables measuring the total execution time taken by all supervisors.

In addition to the metrics 308 illustrated in Tables 9 and 10, another metric 308 may be created to calculate the percentage of time spent by all supervisors compared to all individuals. A new metric type 318, which is shown in Table 11, may be created to serve this purpose. A new metric 308, which is shown in Table 12, uses the metrics 308 of Tables 9 and 10 as inputs to calculate the percentage. Its value is updated by the event handler 330 when an update event 212 is emitted by either of the two metrics 308. If its value is updated, its event handler 330 in turn emits an update event 212 to notify interested parties.

TABLE 11

Metric Type for Computing Percentage

| | |
|---|---|
| Type Identifier | CalcPercentageType |
| Parameters | Metric 1 {type: TotalExecTimeType} |
| | Metric 2 {type: TotalExecTimeType} |
| Dependent Events List | {Metric$_{update}$} |
| Event Handler | OnEvent(Event e) { |
| |   static m1, m2 |
| |   if (e.source = Metric1) |
| |     m1 = e.total |
| |   else |
| |     m2 = e.total |
| |   publish( m1/(m1+m2) * 100%, |
| |   e.instanceid) |
| | } |

TABLE 12

Metric for Computing Percentage

| | |
|---|---|
| Name | PercentageTimeBySupervisors |
| Metric Type | CalcPercentageType |
| Parameters | Metric 1 = TotalTimeByAllSupervisors |
| | Metric 2 = TotalTimeByAllPersons |

After all required metrics 308 are defined, the SLA developer may then create the necessary SLOs 304. In this example, two SLOs 304 are created for two SLAs 204 that are being modeled. The first SLO 304 ensures that the total execution time is less than a specified threshold. A second SLO 304 ensures that the calculated percentage is less than a specified threshold. The following SLO type 320 may be used to model both SLOs 304:

TABLE 13

Example of SLO Type

| | |
|---|---|
| Type Identifier | LessThanSLOType |
| Parameters | Metric (type: Metric) |
| | Threshold (type: int) |
| Dependent Events List | {Metric$_{update}$} |
| Boolean Expression | OnEvent(Event e) { |
| |   if(!(metric < threshold) ) |
| |     publish(violate, e.instanceid); |
| | } |

The above SLO type 320 accepts as inputs a metric and a scalar to ensure that the given metric is less than the scalar value. Its condition is evaluated when an update event 212 is emitted by the dependent metric 308. If the condition is true, it emits a violation event 212, which contains a reference to the violated SLO 304. Given the above SLO type 320, two SLOs 304 may be defined as follows:

TABLE 14

Example of First SLO

| | |
|---|---|
| Name | TotalTimeByAllPersonsSLO |
| SLO Type | LessThanSLOType |
| Parameters | Scope = {TotalTimeByAllPersons} |
| | Threshold = 100 |

TABLE 15

Example of Second SLO

| | |
|---|---|
| Name | PercentageUnderTwentySLO |
| SLO Type | LessThanSLOType |
| Parameters | Scope = {PercentageTimeBySupervisors} |
| | Threshold = 20 |

Referring to FIG. 10, in order to notify a user that an SLA has been violated, an action handler 306 may be written to send an email to the user. One embodiment of an action handler 306 to perform such a task is illustrated in FIG. 10. As shown, the method "sendTo( )" may be described as a common action type which is instantiated twice, with each instantiation configured to notify a different person. The input to the action handler 306 is a violation event 212. Once the action handler 306 is implemented, the SLA developer can model the required SLAs 204 as follows:

SLA1={TotalTimeByAllPersonsSLO, sendNotify}

SLA2={PercentageUnderTwentySLO, sendNotify}

The first SLA 204 ensures that the total execution time used by all individuals is less than 100 hours per day, whereas the second SLA 204 ensures that the percentage of time spent by supervisors is less than 20 percent of the total time spent. If either SLA 204 is violated, the action handler 306 will notify a user in the designated manner.

The flowchart and block diagrams in the Figures illustrate the architecture, functionality, and operation of possible implementations of systems, processes, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for modeling, validating, and monitoring a service level agreement (SLA) associated with a business process, the method comprising:
providing a library of reusable SLA component types;
providing functionality to enable a user to create SLA components from the reusable SLA component types;
providing functionality to enable the user to assemble the SLA components into a hierarchy;
composing, by the processor, a service level agreement model by programmatically implementing the SLA model from the hierarchy of SLA components assembled by the user; the SLA model composed such that events passed between the SLA components can trigger behavior by the SLA components;
verifying, by the processor, that the business process is configured to emit a set of events required to monitor compliance with the service level agreement implemented by the SLA model, wherein the set of events are events required to be received by the SLA components at the lowest levels of the hierarchy; and generating by the processor, a set of monitoring artifacts and executing the service level agreement such that:

the monitoring artifacts respond to events emitted by the business process to evaluate the service level agreement; and the business process enables events necessary to implement the monitoring artifacts such that less than all possible events that are capable of being emitted by the business process are enabled.

2. The method of claim 1, further comprising generating, from the SLA model, a set of runtime monitoring artifacts to monitor the business process.

3. The method of claim 1, further comprising providing at least one of the SLA component types as a select one of a: metric type, service level objective (SLO) type, and action handler type.

4. The method of claim 3, wherein verifying that a business process is configured to emit a set of events further includes determining a dependent events list that designates the events that must be received for the SLA component type to operate.

5. The method of claim 4, further comprising providing at least one SLA component type with an event handler designating the logic to be performed upon receiving an event designated by the dependent events list of the SLA component type.

6. The method of claim 3, wherein providing at least one of the SLA component types as a service level objective (SLO) type comprises providing each SLO type including a Boolean expression expressed in terms of metrics.

7. The method of claim 3, further comprising providing a unique SLA component type identifier for each SLA component type.

8. The method of claim 3, further comprising providing, for each SLA component type, a list of parameters required for the SLA component type to operate.

9. The method of claim 8, wherein providing the list of parameters includes providing a scope parameter, the scope parameter identifying a subsection of the business process monitored by the SLA component type.

10. The method of claim 9, wherein validating further comprises ensuring that start and end activities associated with the scope parameter are present in the business process.

11. An apparatus for modeling, validating, and monitoring a service level agreement (SLA) associated with a business process, the apparatus comprising:

a processor coupled to a memory, wherein the processor is programmed to perform modeling, validating, and monitoring the SLA associated with the business process by executing computer code implementing:

a library of reusable SLA component types;

an editor module to enable a user to create SLA components from the reusable SLA component types;

the editor module further configured to enable the user to assemble the SLA components into a hierarchy, wherein the processor composes a service level agreement model by programmatically implementing the SLA model from the hierarchy of SLA components assembled by the user; the SLA model composed such that events passed between the SLA components can trigger behavior by the SLA components;

a validation module to verify that the business process is configured to emit a set of events required to monitor compliance with the service level agreement implemented by the SLA model, wherein the set of events are events required to be received by the SLA components at the lowest levels of the hierarchy; and a generation process that generates a set of monitoring artifacts and executing the service level agreement such that:

the monitoring artifacts respond to events emitted by the business process to evaluate the service level agreement; and the business process is configured to enable events necessary to implement the monitoring artifacts such that less than all possible events that are capable of being emitted by the business process are enabled.

12. The apparatus of claim 11, wherein the computer code further comprises a generation module to generate, from the SLA model, a set of runtime monitoring artifacts to monitor the business process.

13. The apparatus of claim 11, wherein the SLA component types comprise at least one: metric type, service level objective (SLO) type, and action handler type.

14. The apparatus of claim 13, wherein the metric type includes a list of parameters required for the metric type to operate.

15. The apparatus of claim 14, where the list of parameters includes a scope parameter, the scope parameter identifying a subsection of the business process monitored by the metric type.

16. The apparatus of claim 15, wherein validating further comprises ensuring that start and end activities associated with the scope parameter are present in the business process.

17. A computer-readable storage device with an executable program stored thereon for modeling, validating, and monitoring a service level agreement (SLA) associated with a business process, wherein the program instructs a processor to perform:

providing a library of reusable SLA component types;

enabling a user to create SLA components from the reusable SLA component types;

enabling the user to assemble the SLA components into a hierarchy;

composing a service level agreement model by programmatically implementing the SLA model from the hierarchy of SLA components assembled by the user; the SLA model composed such that events passed between the SLA components can trigger behavior by the SLA components;

verifying that the business process is configured to emit a set of events required to monitor compliance with the service level agreement implemented by the SLA model, wherein the set of events are events required to be received by the SLA components at the lowest levels of the hierarchy; and generating a set of monitoring artifacts and executing the service level agreement such that:

the monitoring artifacts respond to events emitted by the business process to evaluate the service level agreement; and the business process enables events necessary to implement the monitoring artifacts such that less than all possible events that are capable of being emitted by the business process are enabled.

18. The computer-readable storage device of claim 17, further comprising generating, from the SLA model, a set of runtime monitoring artifacts to monitor the business process.

19. The computer-readable storage device of claim 17, wherein the SLA component types comprise at least one: metric type, service level objective (SLO) type, and action handler type.

20. The computer-readable storage device of claim 19, wherein each SLA component type includes a list of parameters required for the SLA component type to operate.

21. The computer-readable storage device of claim 20, where the list of parameters includes a scope parameter, the scope parameter identifying a subsection of the business process monitored by the SLA component type.

22. The computer-readable storage device of claim 21, further ensuring that start and end activities associated with the scope parameter are present in the business process.

* * * * *